(12) United States Patent
Huang et al.

(10) Patent No.: US 10,190,628 B2
(45) Date of Patent: Jan. 29, 2019

(54) MAGNETIC BEARING AND CENTRIFUGAL COMPRESSOR

(71) Applicant: Green Refrigeration Equipment Engineering Research Center of Zhuhai Gree Co., Ltd., Zhuhai, Guangdong (CN)

(72) Inventors: Hui Huang, Guangdong (CN); Yusheng Hu, Guangdong (CN); Dongsuo Chen, Guangdong (CN); Fang Zhang, Guangdong (CN); Xiaobo Zhang, Guangdong (CN); Jianning Liu, Guangdong (CN)

(73) Assignee: Green Refrigeration Equipment Engineering Research Center of Zhuhai Gree Co., Ltd. (CN)

( * ) Notice: Subject to any disclaimer, the term of this patent is extended or adjusted under 35 U.S.C. 154(b) by 370 days.

(21) Appl. No.: 15/021,473

(22) PCT Filed: Sep. 3, 2014

(86) PCT No.: PCT/CN2014/085827
§ 371 (c)(1),
(2) Date: Jun. 22, 2016

(87) PCT Pub. No.: WO2015/035871
PCT Pub. Date: Mar. 19, 2015

(65) Prior Publication Data
US 2016/0298680 A1 Oct. 13, 2016

(30) Foreign Application Priority Data
Sep. 13, 2013 (CN) .......................... 2013 1 0419738

(51) Int. Cl.
*F16C 32/04* (2006.01)
*H02K 7/09* (2006.01)
(Continued)

(52) U.S. Cl.
CPC .......... *F16C 32/0476* (2013.01); *F16C 17/04* (2013.01); *F16C 17/08* (2013.01);
(Continued)

(58) Field of Classification Search
CPC .............. F16C 32/0476; F16C 32/0474; F16C 32/0442; F16C 32/047; F16C 32/044;
(Continued)

(56) References Cited

U.S. PATENT DOCUMENTS

| | | | | |
|---|---|---|---|---|
| 2009/0265038 A1* | 10/2009 | Ramsey | .............. | F16C 32/0476 384/590 |
| 2012/0321439 A1* | 12/2012 | Maier | ................. | F16C 32/0442 310/90.5 |
| 2014/0125176 A1* | 5/2014 | Swann | ................ | F16C 32/0476 310/90.5 |

FOREIGN PATENT DOCUMENTS

| CN | 2414249 | 1/2001 |
|---|---|---|
| CN | 1397949 | 2/2003 |

(Continued)

*Primary Examiner* — Michael Andrews
(74) *Attorney, Agent, or Firm* — Colin P. Cahoon; Shaukat A. Karjeker; Carstens & Cahoon, LLP

(57) ABSTRACT

Disclosed are a magnetic bearing and a centrifugal compressor. The magnetic bearing comprises a revolving shaft (110) and an electromagnetic component, wherein the electromagnetic component is arranged around an outer periphery of the revolving shaft (110), and a gap is formed between the electromagnetic component and the revolving shaft (110) for adjusting a position of the revolving shaft (110). The electromagnetic component comprises an iron core (120) with a winding slot, and coils (150). The coils (150) are arranged in the winding slot. The magnetic bearing (100) also comprises a protection mechanism (140), which is configured to prevent the revolving shaft (110) from colliding with the electromagnetic component, thereby achieving the purpose of axially protecting the magnetic bearing (100).

(Continued)

The centrifugal compressor comprises the magnetic bearing (100), thereby obtaining axial protection and prolonging service life.

8 Claims, 3 Drawing Sheets

(51) Int. Cl.
*F16C 17/04* (2006.01)
*F16C 17/08* (2006.01)
*F16C 39/02* (2006.01)

(52) U.S. Cl.
CPC .......... *F16C 32/0442* (2013.01); *F16C 39/02* (2013.01); *F16C 2360/44* (2013.01); *F16C 2362/52* (2013.01)

(58) Field of Classification Search
CPC ...... F16C 17/04; F16C 17/08; F16C 2362/52; H02K 7/09; H02K 2205/03
USPC ........................................................ 310/90.5
See application file for complete search history.

(56) References Cited

FOREIGN PATENT DOCUMENTS

| | | |
|---|---|---|
| CN | 101092990 | 12/2007 |
| CN | 101771308 | 7/2010 |
| CN | 102155492 | 8/2011 |
| CN | 202451603 | 9/2012 |
| CN | 202883726 | 4/2013 |
| JP | 0230044 | 1/1990 |

\* cited by examiner

MAGNETIC BEARING AND CENTRIFUGAL COMPRESSOR

CROSS REFERENCE TO RELATED APPLICATIONS

This application is a continuation application of PCT Patent Application No. PCT/CN2014/085827, entitled "Multi-stage Centrifugal Compressor and Air Conditioning Unit", filed on Sep. 3, 2014, which claims priority to Chinese Patent Application No. 201310419738.7, entitled "Multi-stage Centrifugal Compressor and Air Conditioning Unit", filed on Sep. 13, 2013, the entire contents of which are incorporated herein by reference.

TECHNICAL FIELD

The present disclosure relates to a magnetic bearing and a centrifugal compressor, more especially, to a magnetic bearing having a protection mechanism, and a centrifugal compressor.

BACKGROUND

When a current is applied to the winding of a magnetic bearing, the magnetic field generated forms a loop between the iron core and the thrust plate, forming electromagnetic force between the iron core and the thrust plate; the air gap distance between the revolving shaft and the stator is measured by a displacement sensor, and the electromagnetic force is regulated through adjusting the current in the winding, so as to control the size of the air gap between the revolving shaft and the stator, thereby realizing a stable magnetic suspension.

In the protection system of the magnetic bearing in the prior art, generally, the magnetic bearing bears radial loads, and an auxiliary bearing is provided to radially protect the magnetic bearing when the loads are out of control, but no axial protection for the magnetic bearing is provided. However, the magnetic bearing is applied in the field of centrifugal compressors and mainly bears axial loads.

FIG. 1 is a schematic sectional view of the magnetic bearing in the prior art. As shown in FIG. 1, the magnetic bearing 100 comprises a revolving shaft 110, an iron core 120, a thrust plate 130, and coils 150.

The thrust plate 130 is fixed on the revolving shaft 110, and keeps a distance L from the iron core 120, wherein L>0. When the magnetic bearing is energized, if the control accuracy is not high or the control system is out of control, due to the attraction of the electromagnetic force, the thrust plate 130 approaches to the iron core 120 and finally collides with the iron core 120, and thus the iron core 120 or the thrust plate 130 is damaged.

In view of the defects above, after a long period of research and practice, the inventors finally obtained the present invention.

SUMMARY OF THE INVENTION

In view of the situations, it is necessary to provide a magnetic bearing which is protected from axial forces, and to provide a centrifugal compressor.

The magnetic bearing of the present disclosure comprises a revolving shaft and an electromagnetic component, wherein the electromagnetic component is arranged around an outer periphery of the revolving shaft; a gap is formed between the electromagnetic component and the revolving shaft to adjust a position of the revolving shaft; the electromagnetic component comprises an iron core with a winding slot, and coils arranged in the winding slot; wherein, the magnetic bearing further comprises a protection mechanism, which is configured to prevent the revolving shaft from colliding with the electromagnetic component.

In one of the embodiments, the magnetic bearing further comprises a thrust plate;
the thrust plate is fixed on the revolving shaft;
the protection mechanism is fixed on the electromagnetic component and arranged around an outer periphery of the thrust plate.

In one of the embodiments, the protection mechanism keeps the thrust plate a distance L away from the electromagnetic component, wherein, L>0.

In one of the embodiments, the protection mechanism comprises a support and a coating; the coating is fixed on an outer surface of the support; and the coating is made of wearable and non-ferromagnetic material.

In one of the embodiments, the protection mechanism is fixed on an inner side or on an outer side of the iron core, or in the winding slot.

In one of the embodiments, the protection mechanism is fixed on the inner side of the iron core, and a positioning slot is disposed in the inner side wall of the iron core to axially position the protection mechanism.

In one of the embodiments, the magnetic bearing further comprises a base, said base is configured to accommodate the revolving shaft and the electromagnetic component; the protection mechanism is fixed on the base.

In one of the embodiments, the protection mechanism is arranged at the intermediate part of the base.

In one of the embodiments, the protection mechanism is fixed through shrinkage fit, an adhesive, or assembling.

The centrifugal compressor of the present disclosure comprises the magnetic bearing above.

As compared with the prior art, the present disclosure has following beneficial effects: the protection mechanism of the magnetic bearing keeps the thrust plate certain distance away from the iron core. When axial loads are out of control, the thrust plate will not collide with the iron core, avoiding damaging the thrust plate or the iron core. The thrust plate cannot contact with the iron core, thereby avoiding excessive remanence, which may be generated after the power is off, and which may cause the thrust plate unable to be separated quickly from the iron core; the protection mechanism is made of wearable and non-ferromagnetic material, thereby not affecting the structure of magnetic path and having no effect on the bearing capacity; it is convenient to install and position the protection mechanism; the protection mechanism has great practicability, and it is convenient for modification of the product in the prior art and for maintenance of the worn product; the centrifugal compressor having the magnetic bearing is protected axially and has long service life.

DETAILED DESCRIPTION OF THE PREFERRED EMBODIMENTS

In order to solve the problem of no axial protection provided for the magnetic bearing, the present disclosure provides a magnetic bearing which is axially protected, and a centrifugal compressor.

The technical features above, additional technical features and the beneficial effects of the present invention will be described in more details with reference to the accompanying figures.

Figure 1:
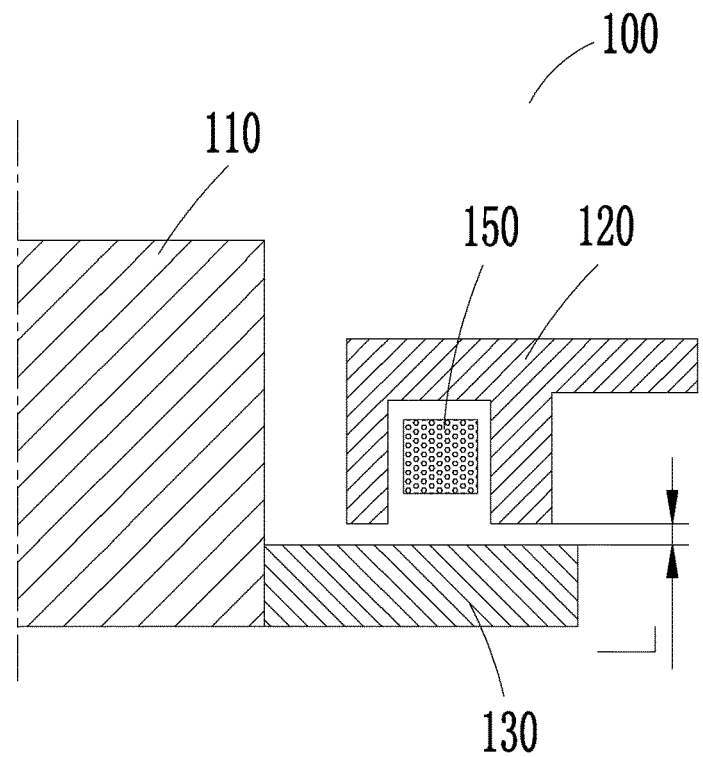
FIG. 1 is a schematic sectional view of the magnetic bearing in the prior art.
Figure 2:
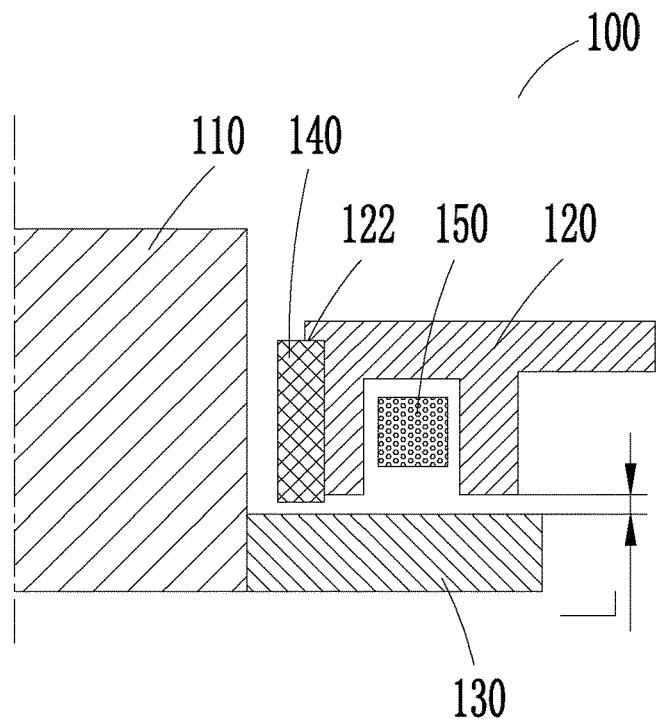
FIG. 2 is a schematic sectional view of the magnetic bearing according to the first embodiment of the present invention.

FIG. 2 is a schematic sectional view of the magnetic bearing according to the first embodiment of the present invention. As shown in FIG. 2, the magnetic bearing 100 comprises a revolving shaft 110, an iron core 120, a thrust plate 130, a protection mechanism 140, and coils 150.

The revolving shaft 110 revolves at a high speed, and the thrust plate 130 is fixed on one end of the revolving shaft 110. The iron core 120 has a winding slot, in which the coils 150 are arranged. The coils 150 are connected to a circuit.

The protection mechanism 140 is non-ferromagnetic, thus the installation of the protection mechanism 140 will not affect the structure of the magnetic path and takes no effect on the bearing capacity of the magnetic bearing 100. The protection mechanism 140 comprises a support and a coating (not shown). The coating is configured to cover and be fixed on the outer surface of the support. The coating is made of wearable and non-ferromagnetic material.

The protection mechanism 140 is cylinder-shaped, and the magnetic bearing 100 is provided with at least one protection mechanism 140.

The protection mechanism 140 keeps the thrust plate 130 a certain distance L away from the iron core 120, wherein, L>0.

When the coils 150 are energized, electromagnetic forces act on the thrust plate 130, and the control system keeps the magnetic bearing 100 to work at the central position. At this position, the distance L is of a nominal value, let be $L_0$.

After the coils 150 is energized, as electromagnetic forces act on the thrust plate 130, the thrust plate 130 approaches to the iron core 120 till the distance L reaches the minimum, let be $L_{min}$, wherein, $L_0 > L_{min} > 0$. When $L_{min}$ is from $(0.5)L_0$ to $(0.8)L_0$, the magnetic bearing 100 has an optimum protection, and the internal arrangement of the magnetic bearing 100 is compact.

After the magnetic bearing 100 is energized, being attracted by the electromagnetic forces, the thrust plate 130 approaches to the iron core 120. When axial loads are out of control, thanks to the protection mechanism 140, the thrust plate 130 will not collide with the iron core 120, thereby preventing the iron core 120 or the thrust plate 130 from being damaged.

What's more, thanks to the protection mechanism 140, the thrust plate 130 cannot contact with the iron core 120. After the magnetic bearing 100 is powered off, excessive remanence, which may cause the thrust plate 130 unable to be quickly separated from the iron core 120, is avoided.

The protection mechanism 140 is fixed through shrinkage fit, an adhesive, or assembling. It is convenient to install and position the protection mechanism; the protection mechanism has great practicability, and it is convenient for retrofitting to the existing products and for the maintenance of the worn products.

In this embodiment, the protection mechanism 140 is fixed on the inner side of the iron core 120, and a positioning slot 122 is disposed in the inner side wall of the iron core 120 to axially position the protection mechanism 140. In order not to affect the magnetic path and the magnetic leakage of the magnetic bearing 100, the positioning slot 122 should be as small as possible, but it should meet the requirements of bearing forces and the requirements of the structural strength of the protection mechanism 140.

Figure 3:
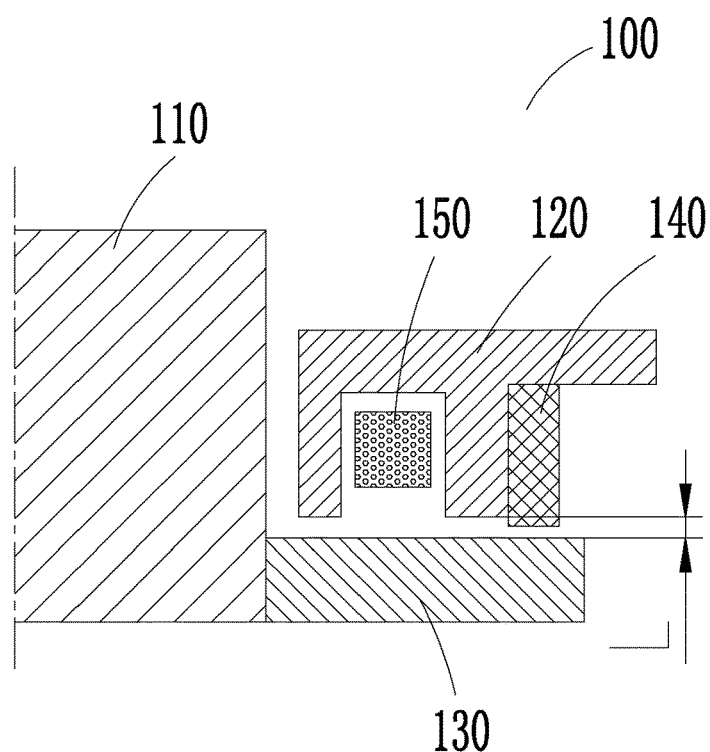
FIG. 3 is a schematic sectional view of the magnetic bearing according to the second embodiment of the present invention.
Figure 4:
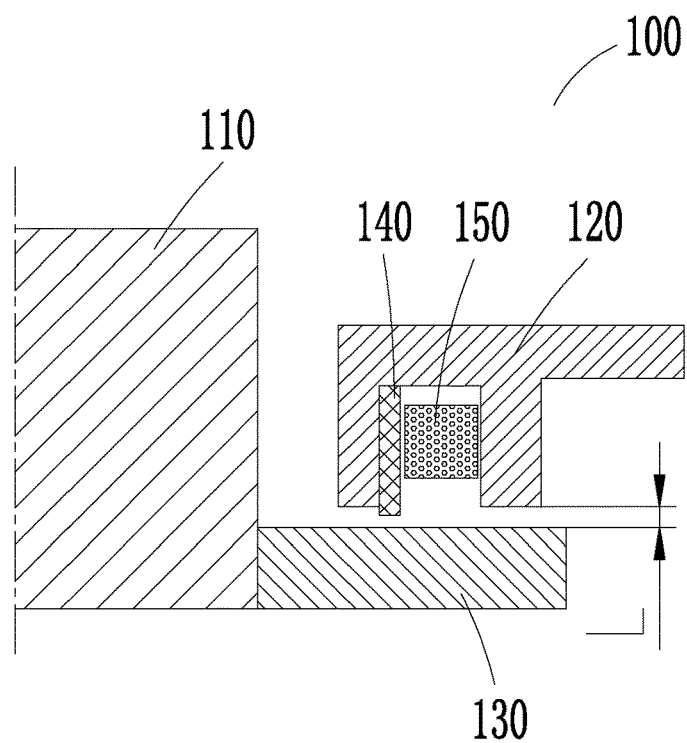
FIG. 4 is a schematic sectional view of the magnetic bearing according to the third embodiment of the present invention.

FIG. 3 is a schematic sectional view of the magnetic bearing according to the second embodiment of the present invention. As shown in FIG. 3, the protection mechanism 140 is fixed on the outer side of the iron core 120. FIG. 4 is a schematic sectional view of the magnetic bearing according to the third embodiment of the present invention. As shown in FIG. 4, the protection mechanism 140 is fixed in the winding slot of the iron core 120.

The protection mechanism 140 is fixed on the inner side or on the outer side of the iron core 120, or in the winding slot of the iron core 120. When the distance between the thrust plate 130 and the iron core 120 is $L_{min}$, the thrust plate 130 touches the protection mechanism 140.

When the axial loads of the magnetic bearing 100 are out of control, the thrust plate 130 revolving at high speed touches the protection mechanism 140, but will not touch the iron core 120, thereby avoiding a collision between the thrust plate 130 and the iron core 120, which takes the effect of protecting the thrust plate 130 and the iron core 120, ensures the mechanical structures of the thrust plate 130 and the iron core 120 intact, and prolongs the service life.

Preferably, the support of the protection mechanism 140 has high rigidity, and is capable of bearing larger axial forces. The coating of the protection mechanism 140 may be elastic to some extent, which performs the function of buffering collision.

Figure 5:
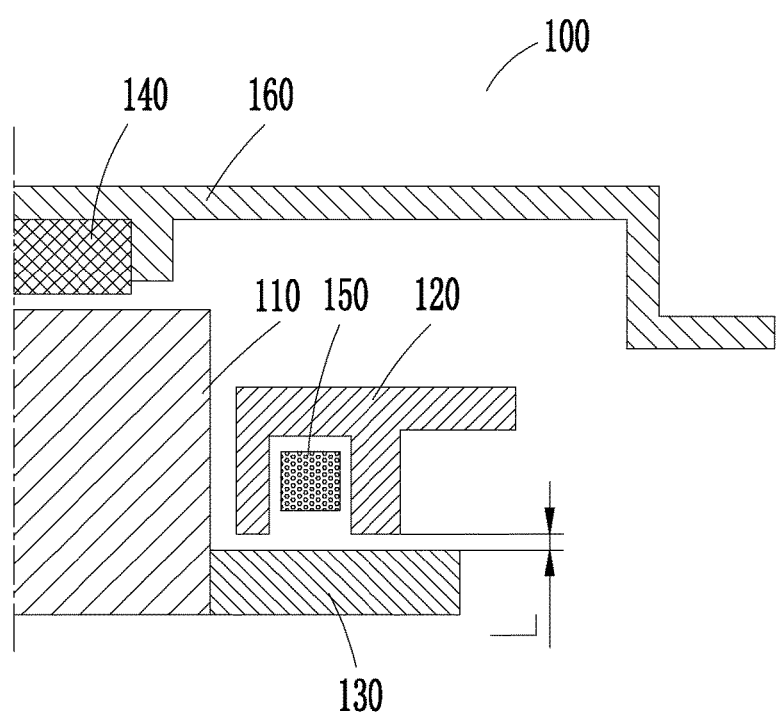
FIG. 5 is a schematic sectional view of the magnetic bearing according to the fourth embodiment of the present invention.

FIG. 5 is a schematic sectional view of the magnetic bearing according to the fourth embodiment of the present invention. As shown in FIG. 5, the magnetic bearing 100 further comprises a base 160. The iron core 120 is arranged between the thrust plate 130 and the base 160.

The protection mechanism 140 is fixed on the base 160. Preferably, the protection mechanism 140 is arranged at the intermediate part of the base 160. When the distance between the thrust plate 130 and the iron core 120 is $L_{min}$, the end of the revolving shaft 110 touches the protection mechanism 140.

As the diameter of the revolving shaft 110 is less than that of the thrust plate 130, the linear velocity of the revolving shaft 110 is relatively smaller. Thereby, when the end of the revolving shaft 110 touches the protection mechanism 140, the friction force acting on the protection mechanism 140 is relatively smaller. The nearer the protection mechanism 140 is to the center of the base 160, the smaller the friction force is.

The present disclosure provides a centrifugal compressor including the magnetic bearing 100. In practical use, the magnetic bearing 100 can be protected effectively, has long service life, and can be separated quickly after being powered off.

What described above are several embodiments of the present invention, and they are specific and in details, but not intended to limit the scope of the present invention. It will be understood by those skilled in the art that various modifications and improvements can be made without departing from the conception of the present invention, and all these modifications and improvements are within the scope of the present invention.

What is claimed is:

1. A magnetic bearing, comprising:
   a revolving shaft;
   an electromagnetic component comprising an iron core with a winding slot, and with coils arranged in the winding slot;
   a thrust plate fixed on the revolving shaft; and
   a protection mechanism configured to prevent the revolving shaft from colliding with the electromagnetic component;
   wherein the electromagnetic component is arranged around an outer periphery of the revolving shaft; a gap is formed between the electromagnetic component and the revolving shaft to provide space for adjusting a position of the revolving shaft; and
   wherein the protection mechanism is fixed in the winding slot on the electromagnetic component and arranged around an outer periphery of the thrust plate.

2. The magnetic bearing according to claim 1, wherein, the protection mechanism keeps the thrust plate a distance L away from the electromagnetic component, wherein, L>0.

3. The magnetic bearing according to claim 1, wherein, the protection mechanism comprises a support and a coating;
   wherein the coating is fixed on an outer surface of the support; and the coating is made of wearable and non-ferromagnetic material.

4. The magnetic bearing according to claim 3, wherein, the protection mechanism is fixed through shrinkage fit, an adhesive, or assembling.

5. The magnetic bearing according to claim 1, wherein, the protection mechanism is fixed through shrinkage fit, an adhesive, or assembling.

6. A centrifugal compressor, comprising the magnetic bearing as defined in claim 1.

7. The centrifugal compressor according to claim 6, wherein, the protection mechanism keeps the thrust plate a distance L away from the electromagnetic component, wherein, L>0.

8. The centrifugal compressor according to claim 6, wherein, the protection mechanism comprises a support and a coating;
   wherein the coating is fixed on an outer surface of the support; and the coating is made of wearable and non-ferromagnetic material.

* * * * *